US008046567B2

(12) United States Patent
Fischer

(10) Patent No.: US 8,046,567 B2
(45) Date of Patent: Oct. 25, 2011

(54) MULTI-THREADED PROCESSOR ARCHITECTURE

(75) Inventor: Michael Andrew Fischer, San Antonio, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1448 days.

(21) Appl. No.: 11/470,721

(22) Filed: Sep. 7, 2006

(65) Prior Publication Data

US 2007/0083738 A1    Apr. 12, 2007

Related U.S. Application Data

(60) Provisional application No. 60/723,699, filed on Oct. 5, 2005, provisional application No. 60/723,165, filed on Oct. 3, 2005, provisional application No. 60/716,806, filed on Sep. 13, 2005.

(51) Int. Cl.
*G06F 9/00* (2006.01)
(52) U.S. Cl. ....................................................... 712/220
(58) Field of Classification Search .................. 712/220
See application file for complete search history.

(56) References Cited

U.S. PATENT DOCUMENTS

| 6,205,468 | B1 | 3/2001 | Diepstraten et al. |
| 6,986,141 | B1 | 1/2006 | Diepstraten et al. |
| 7,752,627 | B2 * | 7/2010 | Jones et al. .................. 718/105 |

OTHER PUBLICATIONS

Parekh, Sujay, et al., "Thread-Sensitive Scheduling for SMT Processors." Department of Computer Science & Engineering, University of Washington, 2000.
Eggers, Susan J., et al. "Simultaneous Multithreading: A Platform for Next-Generation Processors." IEEE Micro, 1997.
Raasch, Steven E., et al. "Applications of Thread Prioritization in SMT Processors." Proc. 1999 Workshop on Multithreaded Execution and Compilation, Jan. 1999.

* cited by examiner

*Primary Examiner* — Alford Kindred
*Assistant Examiner* — Benjamin Geib
(74) *Attorney, Agent, or Firm* — Charles Bergere

(57) ABSTRACT

A multi-threaded processor that is capable of responding to, and processing, multiple low-latency-tolerant events concurrently and while using relatively slow, low-power memories is disclosed. The illustrative embodiment comprises a multi-threaded processor, which itself comprises a context controller and a plurality of hardware contexts. Each hardware context is capable of storing the current state of one thread in a form that enables the processor to quickly switch to or from the execution of that thread. To enable the processor to be capable of responding to low-latency-tolerant events quickly, each thread—and, therefore, each hardware context is prioritized—depending on the latency tolerance of the thread responding to the event.

17 Claims, 3 Drawing Sheets

MULTI-THREADED PROCESSOR ARCHITECTURE

REFERENCE TO RELATED APPLICATIONS

The following patent applications are incorporated by reference:
i. U.S. Patent Application 60/716,806, entitled "Multi-Threaded Processor Architecture," filed 13 Sep. 2005;
ii. U.S. Patent Application 60/723,699, entitled "Computer Processor Capable of Responding with Comparable Efficiency to Both Software-State-Independent and State-Dependent Events," filed 5 Oct. 2005; and
iii. U.S. Patent Application 60/723,165, entitled "Computer Processor Architecture Comprising Operand Stack and Addressable Registers," filed 3 Oct. 2005.

FIELD OF THE INVENTION

The present invention relates to computer science in general, and, more particularly, to an architecture for a multi-threaded processor.

BACKGROUND OF THE INVENTION

The trend in the design of consumer electronics is to build portable electronic appliances (e.g., personal digital assistants, cell phones, etc.) that are capable of communicating via two or more radio protocols (e.g., WiFi, Bluetooth, etc.) concurrently, and this mandates that the processor within the appliance be capable of responding to multiple low-latency-tolerant events.

The requirement that a processor be capable of responding to multiple low-latency-tolerant events has, in general, meant that the processor needed to be fast. A fast processor, however, uses a great deal of wattage and, therefore, drains a portable electronic appliance's batteries quickly, which is, of course, most disadvantageous.

The need exists, therefore, for the development of a processor that is capable of capable of responding to multiple low-latency-tolerant events concurrently and with moderate power consumption.

SUMMARY OF THE INVENTION

The present invention enables the manufacturing and use of processors that are capable of responding to multiple low-latency-tolerant events concurrently and with moderate power consumption. For example, the illustrative embodiment is a multi-threaded processor that is capable of responding to, and processing, multiple low-latency-tolerant events concurrently and while using relatively slow, low-power memories.

In particular, the illustrative embodiment comprises a multi-threaded processor, which itself comprises a context controller and a plurality of hardware contexts. Each hardware context is capable of storing the current state of one thread in a form that enables the processor to quickly switch to or from the execution of that thread. To enable the processor to be capable of responding to low-latency-tolerant events quickly, each thread—and, therefore, each hardware context—is prioritized to reflect the latency tolerance of the event to which it responds.

The context controller switches contexts—and, therefore, access to the processing capability of the processor—among the highest priority threads on a time-sequenced basis (e.g., an instruction-by-instruction basis, etc.). In this way, the controller ensures that the processor exhibits both the low-latency benefit associated with both coarse-grained multi-threaded architectures and the concurrent-processing benefit associated with fine-grained multi-threaded architectures in the prior art.

In accordance with the illustrative embodiment, the processor's memory is constructed of independent memory banks, and the instructions and data for each executing thread are stored in a different bank. This enables the illustrative embodiment to comprise relatively slow-speed program memory because the memory's access time need only be as fast as the amount of time needed by the processor to execute two or more successive instructions in a single thread depending on parameters that are described in detail below.

The illustrative embodiment comprises: (a) H hardware contexts, each of which is capable of storing the execution state of one thread in a multi-threaded processor; and (b) a context controller for:
 (i) activating each of A hardware contexts, wherein each of said A active hardware contexts has a priority,
 (ii) maintaining the E highest priority of the A active hardware contexts as executing hardware contexts, wherein E equals the lesser of A and C, and wherein C equals the maximum number of concurrently executing hardware contexts in the multi-threaded processor, and
 (iii) initiating a context switch in the multi-threaded processor among the E executing hardware contexts on a time-sequenced basis;
 wherein C and H are positive integers and $2<C<H;$ and wherein A and E are non-negative integers and $E \leq A \leq H$.

DETAILED DESCRIPTION

Figure 1:
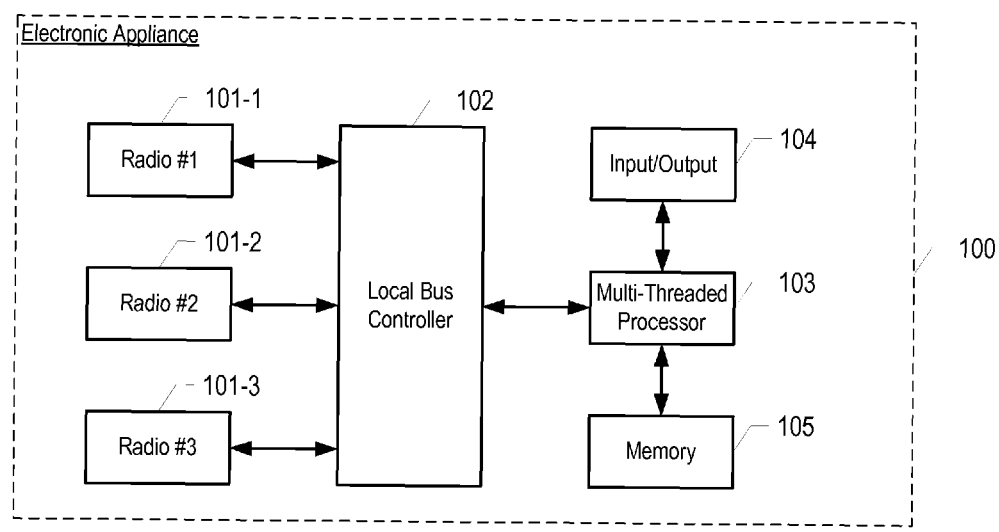
FIG. 1 depicts a block diagram of the logical components of an electronic appliance in accordance with the illustrative embodiment of the present invention.

FIG. 1 depicts a block diagram of the logical components of an electronic appliance in accordance with the illustrative embodiment of the present invention. Electronic appliance 100 comprises: radios 101-1 through 101-3, local bus controller 102, multi-threaded processor 103, input/output 104, and memory 105, interrelated as shown.

Each of radios 101-1 through 101-3 is a standard radio as is well known to those skilled in the art that enables electronic appliance 100 to communicate with other electronic appliances wirelessly. Each of radios 101-1 through 101-3 operates in accordance with a different air-interface: radio 101-1 is IEEE 802.11 compliant, radio 101-2 is IS-95 compliant, and radio 101-3 is Bluetooth compliant. Each of radios 101-1 through 101-3 receive messages independently of each other and that require low-latency responses. It will be clear to those skilled in the art how to make and use radios 101-1 through 101-3.

Local bus controller 102 acts as the interface between radios 101-1 through 101-3 and multi-threaded processor 103 in well-known fashion. For example, local bus controller 102 controls the interaction between radios 101-1 through 101-3 and multi-threaded processor 103. It will be clear to those skilled in the art how to make and use local bus controller 102.

Multi-threaded processor 103 is a general-purpose processor that is capable of interacting with local bus controller 102, input/output 104, and memory 105 as described below and with respect to FIGS. 2 and 3. In particular, multi-threaded processor 103 is capable of executing a plurality of concurrent threads in the manner described below.

Input/output 104 is the non-radio interface for electronic appliance 100 and interacts with multi-threaded processor 103 in well-known fashion.

Memory 105 is the program memory for electronic appliance 100 and comprises C independent memory banks, wherein C is a positive integer greater than 2. The upper bound of C is described below with respect to FIG. 2. The access time of memory 105 is equal to or less than the time required by multi-threaded processor 103 to execute C instructions. In accordance with the illustrative embodiment, the instructions and data for each executing thread is stored in a different bank in memory 105 so that there is no memory contention between threads for data in the same bank. It will be clear to those skilled in the art how to make and use memory 105. It will be clear to those skilled in the art, after reading this disclosure, how to make and use alternative embodiments of the present invention in which memory 105 is tightly-coupled memory or the cache of a multi-level memory hierarchy.

Figure 2:
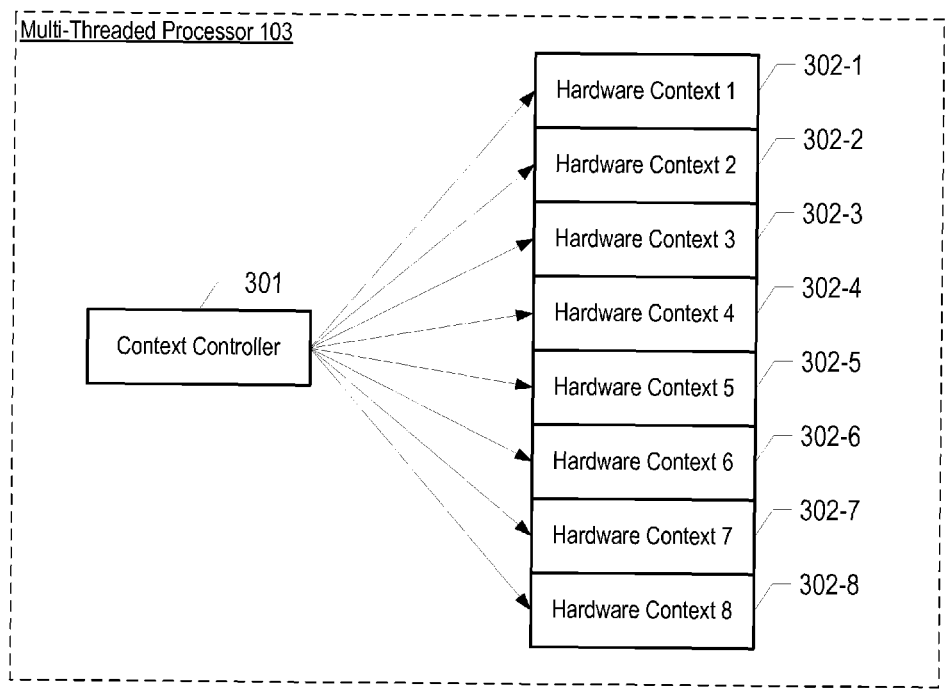
FIG. 2 depicts a block diagram of the salient aspects of multi-threaded processor 103 in accordance with the illustrative embodiment of the present invention.

FIG. 2 depicts a block diagram of the salient aspects of multi-threaded processor 103 in accordance with the illustrative embodiment of the present invention. Multi-threaded processor 103 comprises context controller 301 and H hardware contexts 301-1 through 301-H, wherein H is a positive integer greater than C. In accordance with the illustrative embodiment, H equals 8, but it will be clear to those skilled in the art, after reading this disclosure, how to make and use alternative embodiments of the present invention in which H has any integral value greater than C.

For the purposes of this specification, a "hardware context" is described as the hardware required to store the current state of a thread in a form that enables multi-threaded processor 103 to switch to or from the execution of the thread.

Context controller 301 is capable of monitoring and regulating the population and execution of hardware contexts 301-1 through 301-H, in the manner described below and with respect to FIG. 3. Furthermore, context controller 301 maintains a table which provides the following information for each hardware context:

(i) is the hardware context vacant or populated?
(ii) what is the priority of hardware context?
(iii) is the hardware context active or inactive?
(iv) is the hardware context executing or not?

The answer to each of these questions can be stored in a vector that is part of the hardware context. It will be clear to those skilled in the art, after reading this disclosure, how to make and use alternative embodiments of the present invention in which the answers to these questions are stored in another way.

Figure 3:
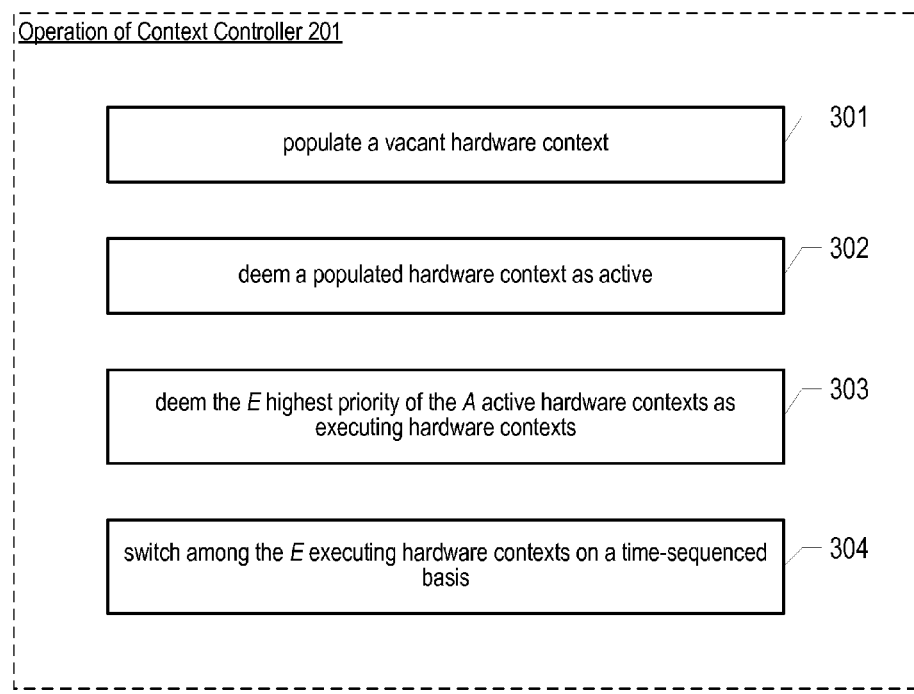
FIG. 3 depicts a chart of the salient tasks associated with the operation of the illustrative embodiment.

FIG. 3 depicts a chart of the salient tasks associated with the operation of the illustrative embodiment. In accordance with the illustrative embodiment, tasks 301, 302, 303, and 304 run concurrently.

At task 301, context controller 201 populates a vacant hardware context of hardware contexts 202-1 through 202-H in response to the spawning of a thread. In accordance with the illustrative embodiment, the thread has a priority, and, therefore context controller 201 associates the priority of that thread with the newly populated hardware context.

It will be clear to those skilled in the art, after reading this disclosure, how to make and use alternative embodiments of the present invention in which hardware contexts 202-1 through 202-H are themselves prioritized and context controller 201 populates a vacant hardware context of hardware contexts 202-1 through 202-H in response to the spawning of a thread, which vacant hardware context has a priority commensurate with the priority of the thread.

As is well known to those skilled in the art, the normal execution of a thread usually, at some point, terminates, and at that point the hardware context for that thread is vacated and becomes available for repopulation. It will be clear to those skilled in the art, after reading this disclosure, how to make and use alternative embodiments of the present invention in which the hardware context for a thread is retained after the normal execution and becomes dormant after the thread has terminated.

At task 302, context controller 201 deems the hardware context populated in task 301 as "active," which hardware context was initially deemed "inactive." For the purposes of this specification, an "active hardware context" is defined as a context that is ready to execute and an "inactive hardware context" is defined as a context that is not ready to execute.

At any one instant, A of hardware contexts 202-1 through 202-H are deemed active, wherein A is a non-negative integer and A≦H. Over time, the value of A can fluctuate as new threads are spawned and completed threads are vacated. Furthermore, the value of A can fluctuate due to the occurrence of events upon which inactive threads are waiting and the voluntary inactivation of threads pending occurrence of expected future events. Furthermore, context controller 201 can deem an active hardware context as inactive when the context encounters a suspension state for whatever reason (e.g., a processor execution stall due to a cache miss, the need to wait for an external event, etc.) and can deem an inactive hardware context as active when the wait or block state has been overcome.

At task 303, context controller 201 deems the E highest-priority of the A active hardware contexts as "executing," wherein E is a non-negative integer and equals the lesser of A and C. For the purposes of this specification, an "executing hardware context" is defined as an active hardware context that is given access to the processing capability of multi-threaded processor 103 and a "non-executing hardware context" is defined as an active hardware context that is not given access to the processing capability of multi-threaded processor 103. Over time, both the value of E can fluctuate as the number of active hardware contexts fluctuates and the members of the set of executing hardware contexts can fluctuate as the relative priority of the active hardware contexts fluctuates. In other words, when E equals C and an inactive hardware context with a higher priority than at least one of the E executing hardware contexts is deemed active, context controller 201 deems the newly activated hardware context as an executing hardware context and deems the lowest priority of the E executing hardware contexts as non-executing. In this way, context controller 201 maintains the E highest-priority of the A active hardware contexts as executing hardware contexts.

At task 304, context controller 201 initiates a context switch among the E executing hardware contexts on a time-sequenced basis. For the purposes of this specification, a "time-sequenced basis" is defined as a resource allocation system that allocates the processing capability of multi-threaded processor 103 across the executing hardware contexts based on time. The switching of contexts on a time-sequenced basis is common among many fine-grained multi-threaded processors.

One example of context switching on a time-sequenced basis is switching on an instruction-by-instruction basis. Another example of context switching on a time-sequenced basis is switching wherein N instructions in each set of N*E successively-executed instructions is from each of the E executing hardware contexts, and wherein N is a positive integer greater and N≧1. When N equals 1, this is equivalent to switching on an instruction-by-instruction basis.

In accordance with the illustrative embodiment, when there are fewer executing hardware contexts than multi-threaded processor 103 can concurrently handle (i.e., E<C), each of the E executing hardware contexts receives 1/Cth of the processing capability of multi-threaded processor 103 and (C−E)/C of the processing capability of multi-threaded processor 103 is not used by any of the E executing hardware contexts. This is advantageous because each thread achieves a uniform processing time, which is advantageous (1) in applications where externally relevant time intervals (e.g., network inter-frame spaces, etc.) are generated directly by the instruction sequence and (2) in low-power applications.

One advantage of context switching on an instruction-by-instruction basis and giving each of the E executing hardware contexts receives 1/Cth of the processing capability of multi-threaded processor 103 is that the instruction execution rate can be synchronized with the memory access. For example, in the case of the illustrative embodiment, the memory is partitioned into C memory banks, and the data for each thread is stored in a different bank. In these cases, the access time of the memory need only be equal to or less than the time required by processor 103 to execute C instructions.

It will be clear to those skilled in the art, however, after reading this disclosure, how to make and use alternative embodiments of the present invention in which each of the E executing hardware contexts receives 1/Eth of the processing capability of multi-threaded processor 103. This is advantageous because it achieves faster processing of each thread and lower response time to external events.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. An apparatus, comprising:
   (a) H hardware contexts, each of which is capable of storing the execution state of one thread in a multi-threaded processor;
   (b) a context controller for:
      (i) activating each of A hardware contexts, wherein each of said A active hardware contexts has a priority,
      (ii) maintaining the E highest priority of said A active hardware contexts as executing hardware contexts, wherein E equals the lesser of A and C, and wherein C equals the maximum number of concurrently executing hardware contexts in said multi-threaded processor,
      (iii) initiating a context switch in said multi-threaded processor among said E executing hardware contexts on a time-sequenced basis, and
      (iv) maintaining a table for each of said H hardware contexts that indicates whether each said hardware context is vacant or populated, active or inactive, and executing or not executing;
   wherein C and H are positive integers and 2<C<H; and
   wherein A and E are non-negative integers and E≦A≦H; and
   (c) a memory configured as C memory banks, wherein the access time of said memory is less than or equal to the time required by said multi-threaded processor to execute C instructions, and the instructions and data for each thread are stored in a different one of the C memory banks so that there is no contention between threads for data in the same bank.

2. The apparatus of claim 1 wherein said time-sequenced basis is an instruction-by-instruction basis.

3. The apparatus of claim 1 wherein N instructions in each set of N*E successively-executed instructions is from each of said E executing hardware contexts, and wherein N is a positive integer.

4. The apparatus of claim 3 wherein N=1.

5. The apparatus of claim 1 wherein each of said E executing hardware contexts receives 1/Eth of the processing capability of said multi-threaded processor.

6. The apparatus of claim 1 wherein each of said E executing hardware contexts receives 1/Cth of the processing capability of said multi-threaded processor.

7. An apparatus, comprising:
   H hardware contexts, each of which is capable of storing the execution state of one thread in a multi-threaded processor;
   a context controller for switching the context in said multi-threaded processor among the E highest priority of A active hardware contexts after each instruction, wherein E equals the lesser of A and C, and wherein C equals the maximum number of concurrently executing hardware contexts in said multi-threaded processor, wherein the context controller maintains a table for each of said H hardware contexts that indicates whether each said H hardware context is vacant or populated, active or inactive, and executing or not executing; and
   a memory configured as C memory banks, wherein the access time of said memory is less than or equal to the time required by said multi-threaded processor to execute C instructions, and the instructions and data for each thread are stored in a different one of the C memory banks so that there is no contention between threads for data in the same bank;
   wherein C and H are positive integers and 2<C<H; and
   wherein A and E are non-negative integers and E≦A≦H.

8. The apparatus of claim 7 wherein N instructions in each set of N*E successively-executed instructions is from each of said E executing hardware contexts, and wherein N is a positive integer.

9. The apparatus of claim 8, wherein N=1.

10. The apparatus of claim 7 wherein each of said E executing hardware contexts receives 1/Eth of the processing capability of said multi-threaded processor.

11. The apparatus of claim 7 wherein each of said E executing hardware contexts receives 1/Cth of the processing capability of said multi-threaded processor.

12. An apparatus, comprising:
   H hardware contexts, each of which is capable of storing the execution state of one thread in a multi-threaded processor;
   a context controller for switching the context in said multi-threaded processor among the E executing hardware contexts a time-sequenced basis, wherein the context controller maintains a table for each of said H hardware contexts that indicates whether each said H hardware context is vacant or populated, active or inactive, and executing or not executing; and a memory configured as C memory banks, wherein the access time of said memory is less than or equal to the time required by said multi-threaded processor to execute C instructions, and the instructions and data for each thread are stored in a different one of the C memory banks so that there is no contention between threads for data in the same bank;

wherein each of said E executing hardware contexts receives 1/Cth of the processing capability of said multi-threaded processor;

wherein (C−E)/C of the processing capability of said multi-threaded processor is not used by any of said E executing hardware contexts;

wherein E equals the lesser of A and C, and wherein C equals the maximum number of concurrently executing hardware contexts in said multi-threaded processor; and wherein E is a non-negative integer, C and H are positive integers, and $2 \leq E < C < H$.

13. The apparatus of claim 12 wherein said time-sequenced basis is an instruction-by-instruction basis.

14. The apparatus of claim 12 wherein N instructions in each set of N*E successively-executed instructions is from each of said E executing hardware contexts, and wherein N is a positive integer.

15. The apparatus of claim 14 wherein N=1.

16. The apparatus of claim 12 wherein each of said E executing hardware contexts receives 1/Eth of the processing capability of said multi-threaded processor.

17. The apparatus of claim 12 wherein each of said E executing hardware contexts receives 1/Cth of the processing capability of said multi-threaded processor.

* * * * *